United States Patent [19]
Nasu et al.

[11] Patent Number: 4,847,867
[45] Date of Patent: Jul. 11, 1989

[54] SERIAL BUS INTERFACE SYSTEM FOR DATA COMMUNICATION USING TWO-WIRE LINE AS CLOCK BUS AND DATA BUS

[75] Inventors: Masaki Nasu; Shigetatsu Katori; Yukio Maehashi; Kazutoshi Yoshizawa, all of Tokyo, Japan

[73] Assignee: NEC Corporation, Tokyo, Japan

[21] Appl. No.: 91,803

[22] Filed: Sep. 1, 1987

[30] Foreign Application Priority Data

Sep. 1, 1986 [JP] Japan ................................ 61-206405
Sep. 1, 1986 [JP] Japan ................................ 61-206407

[51] Int. Cl.⁴ .................................................. H04L 7/08
[52] U.S. Cl. ........................................ 375/36; 370/85; 375/106
[58] Field of Search ................................ 375/29-36, 375/106-107; 370/24-29, 85; 340/825.2, 825.21

[56] References Cited

U.S. PATENT DOCUMENTS

| | | | |
|---|---|---|---|
| 3,858,059 | 12/1974 | Khanna | 375/36 |
| 3,916,108 | 10/1975 | Schwartz | 370/85 |
| 4,184,045 | 1/1980 | Philipson | 375/36 |
| 4,225,752 | 9/1980 | Looschen | 375/106 |
| 4,301,532 | 1/1981 | Janetzky | 370/85 |
| 4,437,021 | 3/1984 | Sumi et al. | 375/36 |
| 4,475,191 | 10/1984 | James et al. | 375/106 |

FOREIGN PATENT DOCUMENTS 0051332 4/1984 European Pat. Off. .

Primary Examiner—Benedict V. Safourek
Attorney, Agent, or Firm—Foley & Lardner, Schwartz, Jeffery, Schwaab, Mack, Blumenthal & Evans

[57] ABSTRACT

A serial data communication system is disclosed. This system includes a plurality of stations which are interconnected by a single clock wire and a single data wire. A master station in the stations includes a transistor push-pull circuit for driving the clock wire to output a clock signal on the clock wire. The clock signal thus has sharp leading and falling edges. The data wire is coupled to wire logic means. A transmitting station transmits each bit of a data signal on the data wire in synchronism with one of leading and falling edges of the associated clock pulse of the clock signal, and a receiving station receives each bit of the data signal in synchronism with the other of leading and falling edges of the associated clock pulse.

10 Claims, 4 Drawing Sheets

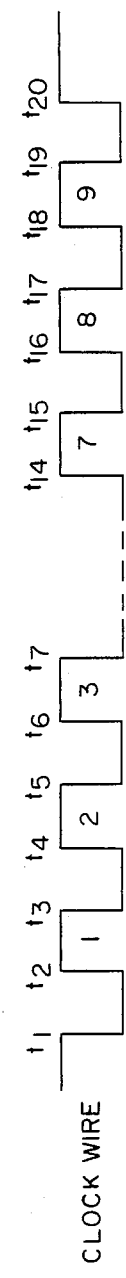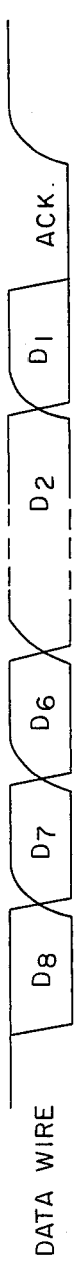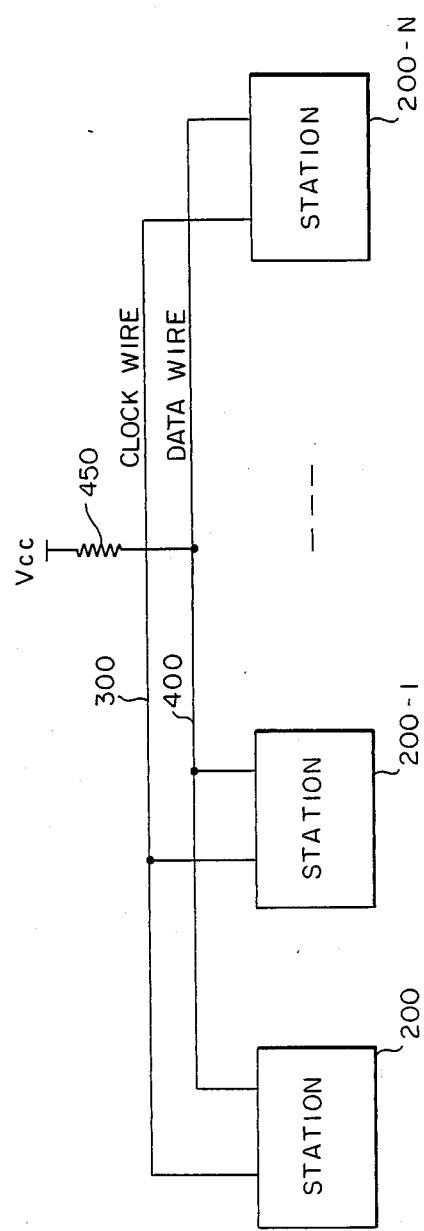
FIG. 2
FIG. 3

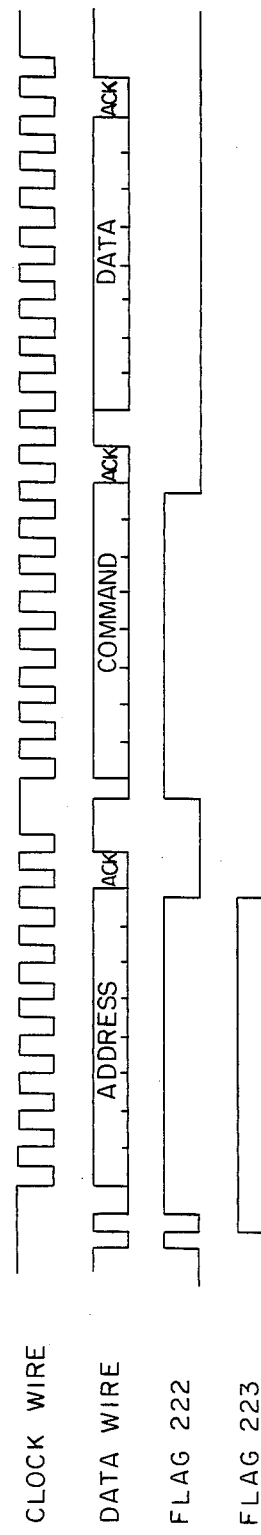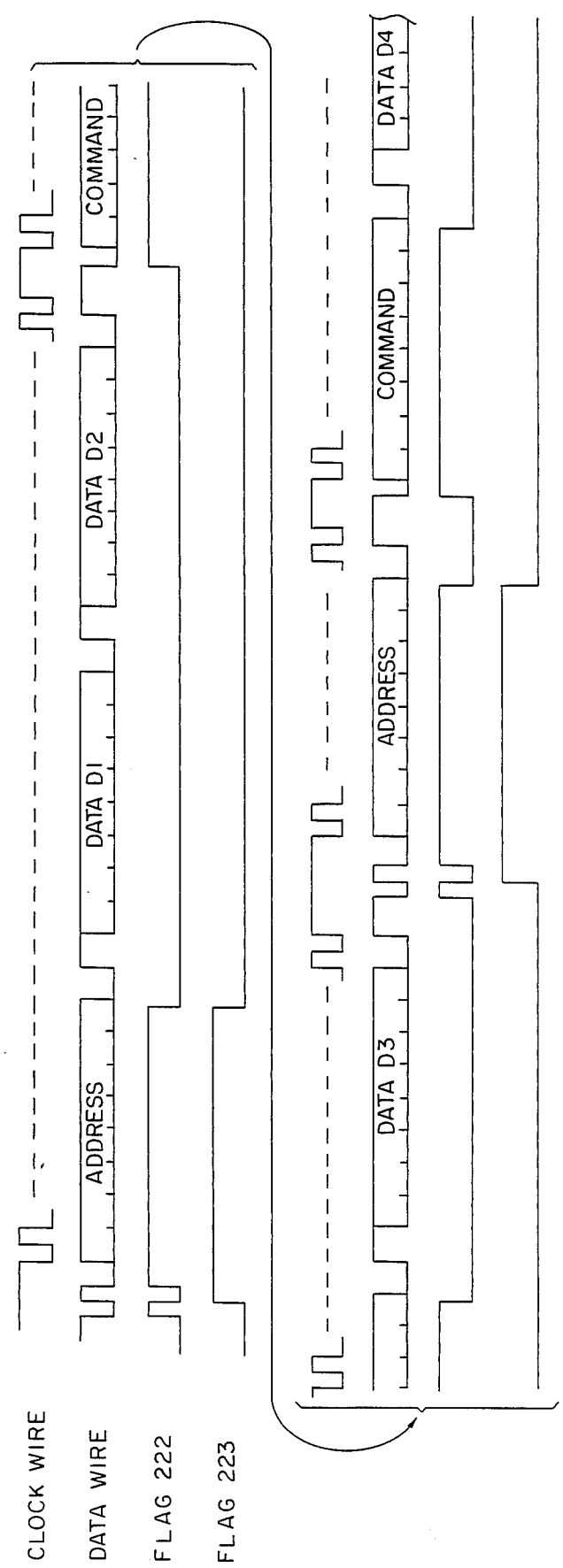

SERIAL BUS INTERFACE SYSTEM FOR DATA COMMUNICATION USING TWO-WIRE LINE AS CLOCK BUS AND DATA BUS

BACKGROUND OF THE INVENTION

The present invention relates to a serial data communication system using a two-write line and more particularly to such a system that a plurality of stations are interconnected by two-wire line comprising a data wire to transfer data therethrough and a clock write to transfer a clock signal for controlling the data transfer.

A serial data communication system of this type is disclosed in European Pat. No. 0051332 published on Apr. 11, 1984. In this system, both the clock and data wires are connected to a power source via the associated pull-up resistor. A master station includes an MOS transistor of an open drain type (or a bipolar transister of an open collector type) having a drain (or a collector) connected to the clock wire, a source (or an emitter) connected to a reference terminal and a gate (or a base) supplied with a clock control signal, while a transmitting station includes a transistor of an open drain (collector) type having a drain (collector) connected to the data wire, a source (emitter) connected to the reference terminal and a gate (base) supplied with a data signal. This communication system, however, has a serious disadvantage that the data transmitting speed is slow, because the clock signal is transmitted to the clock wire by discharging the clock wire by the transistor, and charging the clock wire by the pull-up resistor. The charging time constant is long. Since each bit of the data signal is transmitted in synchronism with the associated clock pulse of the clock signal, the data signal cannot be transmitted at a high speed.

SUMMARY OF THE INVENTION

Therefore, an object of the present invention is to provide a two-wire line serial data communication system in which data signals are transmitted at a high speed.

Another object of the present invention is to provide a serial data interface system for transmitting a data signal at a high speed.

A system according to the present invention comprises a plurality of stations which are interconnected by a single clock wire and a single data wire, and is featured in that the clock wire is driven by a push-pull transistor circuit in a master station and the data wire is coupled to wired logic means and that a transmitting station transmits each bit of a data signal on the data wire in synchronism with one of leading and falling edges of the associated clock pulse of a clock signal on the clock wire and a receiving station receives each bit data on the data wire in synchronism with the other of the leading and falling edges of the associated clock pulse.

Since the clock wire is driven by the transistor push-pull circuit in the master station, both of the charging and discharging time constants of the clock wire become very small, so that each clock pulse of the clock signal appearing on the clock wire has a rapid leading edge and a rapid falling edge. Accordingly, the transmitting station can transmit each bit of the data signal on the data wire in synchronism with one of the leading and falling edges of the associated lock pulse, and the receiving station can receive each bit data on the data wire in synchronism with the other of the leading and falling edges of the associated clock pulse. Thus, the data transmitting is performed at a high speed.

BRIEF DESCRIPTION OF THE DRAWINGS

The above and other objects, advantages and features of the present invention will be more apparent from the following description taken in conjunction with the accompanying drawings, in which

FIG. 2 is a timing chart representing an operation of the system shown in FIG. 1;

FIG. 3 is a system diagram according to another embodiment of the present invention;

FIG. 5 is a timing chart representing an operation of the system shown in FIGS. 3 and 4; and FIG. 6 is a timing chart representing another example of a data communication of the system shown in FIGS. 3 and 4.

DETAILED DESCRIPTION OF THE EMBODIMENTS

Figure 1:
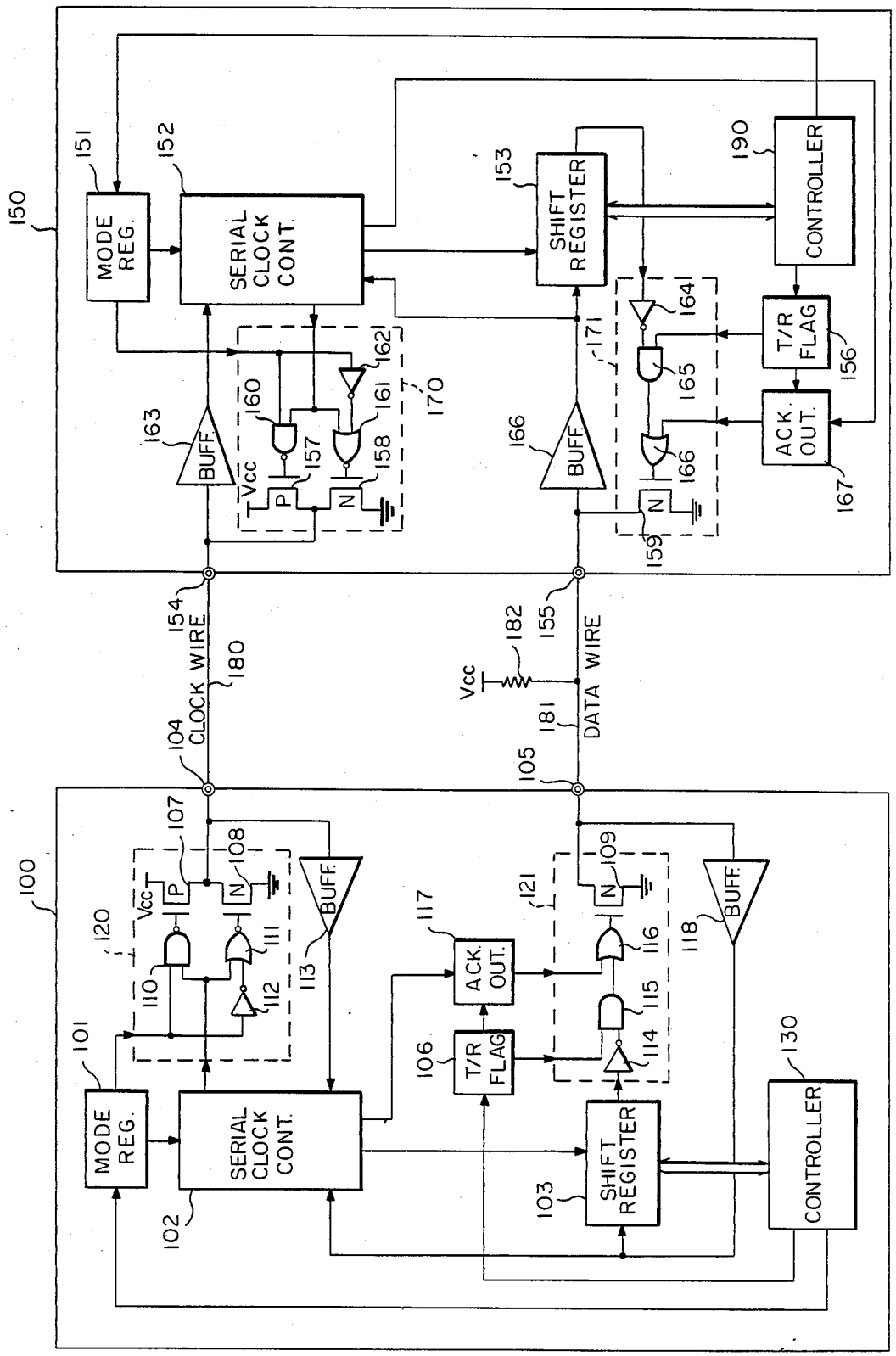
FIG. 1 is a system diagram according to an embodiment of the present invention.

Referring to FIG. 1, a communication system according to an embodiment of the present invention includes two stations 100 and 150 which are interconnected by a single clock wire 180 and a single data wire 181. Only the data wire 181 is connected via a pull-up resistor 182 to a power terminal Vcc.

The first station 100 is fabricated as a monolithic integrated circuit device and has a controller 130, a mode register 101, a serial clock control circuit 102, a shift register 103, a transmitting/receiving control flag 106, an acknowledge-signal output circuit 117, a serial clock output circuit 120, a serial clock input buffer 113, a serial data output circuit 121 and a serial data input buffer 118. The station 100 further has a serial clock input/output terminal 104 connected to one end of the clock line 180 and a serial data input/output terminal 105 connected to one end of the data wire 181.

The serial clock output circuit 120 comprises a C-MOS transistor push-pull circuit consisting of a P-channel MOS transistor 107 and an N-channel MOS transistor 108, a NAND gate 110, a NOR gate 111, and an inverter 112. The transistors 107 and 108 are connected in series between the power terminal Vcc and a ground terminal, and the connection point of the transistors 107 and 108 is connected to the serial clock input/output terminal 104.

The mode register 101 is used to designate and station 100 to a master station or a slave station. When the content of the mode register 101 is "1", and the NAND gate 110 and the NOR gate 111 supply an inverted level of the output of the serial clock control circuit 102 to the transistors 107 and 108, respectively. When the output of the circuit 102 takes a high level, the transistor 107 is turned ON to charge the clock wire 180 which thereby takes the high level. The clock wire 180 is discharged by the transistor 108 when the output of the circuit 102 takes a low level, so that the low level appears on the clock line 180. Thus, the station 100 operates as a master station to output a clock signal on the clock wire 180. At this time, the clock wire 180 is charged and discharged by the transistors 107 and 108, respectively, and therefore the clock signal on the clock wire 180 has sharp leading and falling edges, even when the clock wire 180 has a relatively large stray capacitance. When the content of the mode register 101 is "0", the NAND gate 110 supplies the high level to the transistor 107 and the NOR gate 111 supplies the low level to the transistor 108 irrespective of the output of the serial clock control circuit 102. Both of the transistors 107 and 108 are thereby turned OFF to bring the output of the serial clock output circuit 120 into a high impedance state, thereby disconnecting the circuit 120 from the clock terminal 104. Thus, the station 100 operates as a slave station to receive a clock signal via the clock wire 180 from the second station 150. The clock signal supplied to the station 100 is inputted through the input buffer 113 to the serial clock control circuit 102.

The serial data output circuit 121 comprises an open-drain buffer consisting of an N-channel MOS transistor 109, an inverter 114, an AND gate 115, and an OR gate 116. In the case where the flag 106 is "1", the AND gate 115 takes an open state and the output of the shift register 103 paths through the inverter 114 and the AND gate 115. Since the flag 106 is "1", the acknowledge-signal output circuit 117 does not operate and produces a low level output. Therefore, an inverted level of the output of the shift register 103 is supplied to the transistor 109. When the output of the shift register 103 takes the low level, the transistor 109 is turned ON to discharge the data wire 181 which thereby takes the low level. The transistor 109 is turned OFF by the high level output of the shift register 103. The data wire 181 is thereby charged to the high level by the resistor 182. The shift register 103 shifts data stored therein to output each bit of the data in response to the change from the high level to the low level of a shift clock supplied from the serial clock control circuit 102. Thus, the station 100 operates as a data transmitting station to transmit a data signal on the data wire 181. When the flag 106 is "0", the AND gate 115 is closed and prevents the output of the shift register 103 from being supplied to the transistor 109. Thus, the station 100 operates as a data receiving station to receive a data signal on the data wire 181 outputted from the station 150. In a data receiving mode, the shift register 103 catches each bit of the data signal supplied through the input buffer 118 in response to the change of the shift clock from the low level to the high level. If the shift register in a data transmitting station outputs each bit data in response to the change of the shift clock from the low level to the high level, the shift register in a receiving station catches each bit data in response to the change from the high level to the low level of the shift clock.

The serial clock control circuit 102 includes an oscillator (not shown) and in a master station mode supplies an oscillation signal to the serial clock output circuit 120 and further to the shift register 103 as a shift clock signal. In a slave station mode, the control circuit 102 supplies the clock signal appearing at the output of the input buffer 113 to the shift register 103.

The controller 103 carries out the control of the contents of the mode register 101 and the flag 106 and the data read/write operation of the shift register 103.

The second station 150 is also fabricated as a monolithic integrated circuit device and has the same construction as the first station 100. Although denoting by different reference numerals, therefore, the second station 150 includes a controller 190, a mode register 151, a serial clock control circuit 152, a shift register 153, a serial clock output circuit 170, a serial clock input buffer 163, a serial data output circuit 171, a serial data input buffer 166, a transmitting/receiving control flag 156, an acknowledge-signal output circuit 167, a serial clock input/output terminal 154 connected to the other end of the clock wire 180, and a serial data input/output terminal 155 connected to the other end of the data wire 181. The serial clock output circuit 170 comprises a P-channel MOS transistor 157, an N-channel MOS transistor 158, a NAND gate 160, a NOR gate 161 and an inverter 161, and the serial data output circuit 171 comprises an N-channel MOS transistor 159, an inverter 164, an AND gate 165 and an OR gate 166.

The data wire 181 takes the low level when any one of the transistors 109 and 159 is turned ON and the high level by the resistor 182 when both of them are turned OFF. Therefore, the data wire 181 is provided with logic means for forming a wired logic function between the low level and the high level which are transmitted by the stations 100 and 150.

A serial data communicating operation between the stations 100 and 150 will be described below with reference to FIG. 2. Assuming that the first station 100 operates as a master station and as a data transmitting station, the controller 130 sets the data "1" into the mode register 101 and the transmitting/receiving control flag 106 and stores into the shift register 103 the eight-bit data to be transmitted. The serial clock output circuit 120 and the serial data output circuit 121 are thereby activated and connected to the clock wire 180 and the data wire 181, respectively. On the other hand, the controller 190 in the station 150 resets the mode register 157 and the flag 156. Before the data-transmitting, the outputs of the serial clock control circuit 102 and the shift register 103 are held at the high level. The transistor 107 is thus turned ON, so that the clock wire 180 takes the high level. The transistor 109 is turned OFF, and hence the data wire 181 is pulled up to the high level by the resistor 182.

In order that the station 100 operates as a master station, the serial clock control circuit 102 responds to the oscillation signal of the oscillator (not shown) contained therein to change its output from the high level to the low level at a timing $t_1$ shown in FIG. 2. The transistors 107 and 108 are thereby turned OFF and ON, respectively, to discharge the clock wire 180. The serial clock control circuit 102 also changes the shift clock supplied to the shift register 103 from the high level to the low level, so that the register 103 shifts the data stored therein by one bit to output the eighth bit data $D_8$, as shown in FIG. 2. When the outputted eighth bit data $D_8$ is "0", the transistor 109 is turned ON to discharge the data wire 181. In a case where the eighth bit data $D_8$ is "1", the transistor 109 is held in a non-conducting state, so that the high level of the data wire 181 is not changed. At a timing $t_2$ shown in Fig.. 2, the serial clock control circuit 102 changes its output from the low level to the high level. Accordingly, the transistors 107 and 108 are turned ON and OFF, respectively, so that the clock wire 180 is charged to the high level. Since the charging and discharging of the clock wire 180 are carried out by the transistors 107 and 108, respectively, the clock signal on the wire 180 has a sharp leading edge and a sharp falling edge, as shown in FIG. 2. This sharp leading edge of the clock signal is supplied via the input buffer 163 to the serial clock control circuit 152 in the station 150. The control circuit 152 responds to the sharp leading edge and changes the shift clock supplied to the shift register 153 from the low level to the high level. Thus, the shift register 153 catches the level on the data wire 181 supplied thereto via the input buffer 166. At a timing $t_3$ shown in FIG. 2, the serial clock control circuit 102 changes its output to the low level to turn the transistor 108 ON, and the shift register 103 outputs the seventh bit data $D_7$. Assuming that the eighth and seventh bit data $D_8$ and $D_7$ are "0" and "1", respectively, the transistor 109 is changed from the conducting state to the non-conducting state by the output of the seventh bit data $D_7$. Accordingly, the data line 181 is charged by the resistor 182 to the high level with a time constant determined by the stray capacitance of the data line 181 and the resistance value of the resistor 182. When the data line 181 has the stray capacitance of 200 pF and the resistor 182 has the resistance value of 1KΩ, the time constant is 200 nsec. Thus, the station 100 operating as a master and transmitting station outputs on the clock wire 180 a serial clock signal having sharp falling and leading edges and transmits each bit of a data signal on the data wire 181 in synchronism with the falling edge of the associated clock pulse of the clock signal, and the station 150 operating as a slave and receiving station is supplied with the clock signal via the clock wire 180 and receives or catches each bit of the data signal via the data wire 181 in synchronism with the leading edge of the associated clock pulse of the clock signal. At a timing $t_{15}$ shown in FIG. 2, the first bit data $D_1$ is transmitting on the data line 181, and the shift register 153 catches the level of the data line 181 at a timing $t_{16}$. The controller 190 then reads out the data in the shift register 153 and carried out a predetermined data processing by use of the read-out data.

When the station 100 outputs eight clock pulses on the clock wire 180, the output of the shift register 103 is returned to the high level in synchronism with the falling edge at a timing $t_{17}$, so that the transistor 109 takes the non-conducting state. The serial clock control circuit 152 (102) includes a counter (not shown) to detect the number of the clock pulses on the clock line 180 and thus outputs an enable-signal to the acknowledge-signal output circuit 167. Accordingly, the circuit 167 produces a high level output in synchronism with the falling edge of the clock signal at the timing $5_{17}$. The transistor 59 is thereby turned ON to produce the low level on the data line 181, as shown in FIG. 2. That is, the station 150 sends back an acknowledge-signal to the station 100 as a result of receiving the eight-bit data signal. The output of the data input buffer 118 is also supplied to the serial clock control circuit 102 which detects the supplied level in synchronism with the leading edge of the clock signal at a timing $t_{18}$. At this time, since the output of the buffer 118 is the low level, the station 100 recognizes that the data signal has been transmitted to the station 150. The station 100 outputs thereafter the falling edge on the clock wire 180 at a timing $t_{19}$, so that the serial clock control circuit 152 in the station 150 causes the acknowledge-signal output circuit 167 to produce the low level output. The transistor 159 is thereby turned OFF and the data wire 181 is changed to the high level by the resistor 182. At a timing $5_{20}$, the serial clock control circuit 102 changes its output to the high level and holds the high level output to stop the output of the clock signal. Thus, the data transmitting from the station 100 to the station 150 is completed.

Since each bit of the data signal is transmitted in synchronism with the sharp falling edge of the associated clock pulse of the clock signal and is received in synchronism with the sharp leading edge thereof, the data communication is carried out at a high speed.

When the station 100 operates as a master and receiving station and the station 150 operates as a slave and transmitting station, the mode register 101 and the flag 156 are set and the register 151 and the flag 106 are made clear. The shift register 153 outputs each bit of data stored therein in synchronism with each falling edge of the clock signal produced from the station 100, and the sift register 103 receives each bit data in synchronism with each leading edge of the clock signal. If the station 150 does not operate as a master station, the mode register 151 and the serial clock output circuit 170 are omitted.

Figure 4:
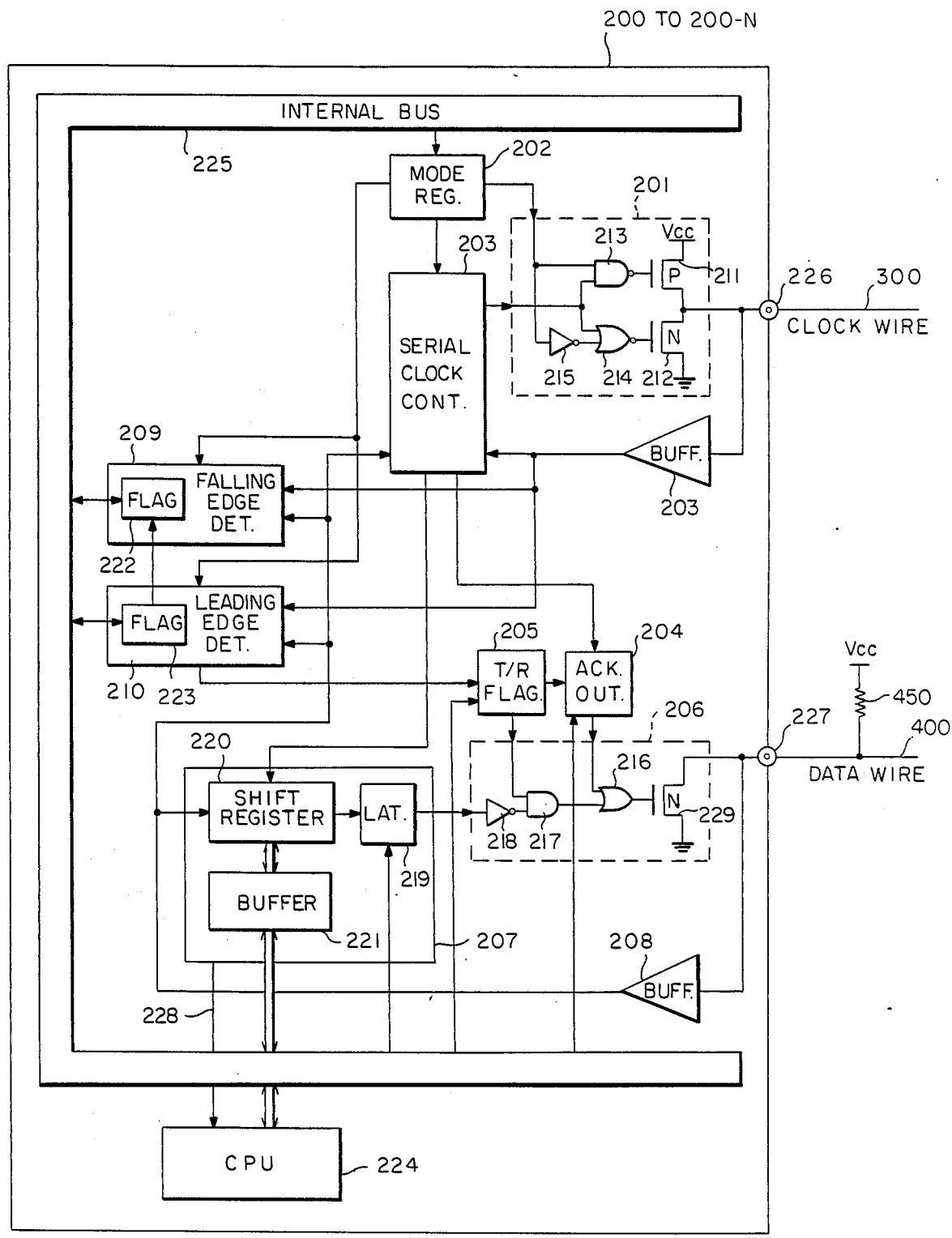
FIG. 4 is a block diagram representing each of stations shown in FIG. 3.

Referring to FIG. 3, another embodiment of the present invention comprises a plurality of stations (three stations 200, 200-1 and 200-N being shown in the drawing) which are interconnected by a single clock wire 300 and by a single data wire 400. Only the data wire 400 is connected via a pull-up resistor 450 to a power terminal Vcc. Each of the stations 200 to 200-N includes a circuit construction shown in FIG. 4 to communicate data among them.

More specifically, a serial clock input/output terminal 226 is connected to the clock wire 300 and a serial data input/output terminal 227 is connected to the data wire 400. A mode register 202 designates the station to a master station or a slave station. In a master station operating mode, a serial clock control circuit 203 operatively produces a serial clock signal which is in turn outputted on the clock wire 300 through a serial clock output circuit 201 and the terminal 226. In a slave station operating mode, a serial clock signal on the clock wire 300 is inputted via an input buffer 203 to the control circuit 203. The output circuit 201 comprises a P-channel MOS transistor 211, an N-channel MOS transistor 212, and NAND gate 213, a NOR gate 214 and an inverter 215. The clock wire 300 is thus driven by a C-MOS push-pull circuit. A transmitting/receiving control flag 205 designates the station to a transmitting station or a receiving station. In a transmitting station operating mode, a serial data control circuit 207 produces a signal to be transmitted which is in turn outputted on the data wire 400 through a serial data output circuit 206 and the terminal 227. In a receiving station operating mode, a signal on the data wire 400 is inputted via an input buffer 208 to the control circuit 207. The serial data output circuit 206 comprises an N-channel MOS transistor 229, an OR gate 216, an AND gate 217 and an inverter 218. The data wire 400 is thus driven by an open-drain buffer circuit. The serial data control circuit 207 includes a shift register 220, a presentable latch circuit 219 and a data buffer circuit 221. An acknowledge-signal output circuit 204 controls an output of an acknowledge-signal to a transmitting station. The outputs of the input buffers 203 and 208 are further supplied to a leading edge detector 210 and a falling edge detector 209. The leading edge detector 210 detects a leading edge, i.e. a change from the low level to the high level, of the data wire 400 while the clock wire 300 is in the high level and sets a flag 223 therein. The detector 210 resets the transmitting/receiving control flag 205 in response to the set state of the flag 223. The falling edge detector 209 detects a falling edge, i.e. a change from the high level to the low level, of the data wire 400 while the clock wire 300 is in the high level and sets a flag 222 therein. The detector 210 further resets the flag 222 in response to the set state of the flag 223. Each station further includes an internal bus 225 to interconnect a central processing unit (called hereinafter "CPU") 224 and each of the serial data control circuit 207, the mode registers 202, the acknowledge-signal output circuit 205 and the flags 205, 222 and 223.

Assuming that the station 200 operates as a master station and the remaining stations 200-1 to 200-N operate as a slave station, the mode register 202 in the station 200 is set by the CPU 224 and the mode registers in the remaining station 200-1 to 200-N are reset. The transistor 211 in the master station 200 is thereby turned ON to hold the clock wire 300 at the high level, as shown in FIG. 5. Since a plurality of slave stations 200-1 to 200-N more than two are interconnected, the master station 200 should select one of the slave stations 200-1 to 200-N to be communicated. In other words, the master station 200 is required to output an address signal on the data wire 400. For this purpose, the CPU 224 in the master station 200 sets the transmitting/receiving control flag 205 and stores eight-bit address data into the shift register 220 through the data buffer 221. Further, the CPU 224 stores data "0"into the presetable latch circuit 219, so that the transistor 229 is turned ON to output on the data wire 400 a change from the high level to the low level, as shown in FIG. 5. This level change on the data wire 400 are supplied in common to all the slave stations 200-1 to 200-N. The falling edge detector 209 in each slave station thereby sets the flag 222. In the master station 200, the detectors 209 and 210 is in an inactivating state by the high level output of the mode register 202. The CPU 224 in the master station 200 thereafter restores the data "1" into the latch circuit 219 to turn the transistor 229 OFF. The data wire 400 is thereby changed to the high level by the resistor 450 with a time constant determined by the stray capacitance of the wire 400 and the resistance value of the resistor 450. It should be noted that this time constant is neglected in FIG. 5. The change to the high level on the data wire 400 is supplied in common to all the slave stations 200-1 to 200-N, so that the leading edge detector 210 in each slave station sets the flag 223 and resets the flags 205 and 209. All the slave stations 200-1 to 200-N thus operate as a receiving station. The CPU 224 in the master station 200 further restores the data "0" in the latch circuit 219. The flag 222 in each of the slave and receiving stations 200-1 to 200-N is thereby set again, as shown in FIG. 5. Thus, the master station 200 outputs on the data wire 400 a first signal having a leading edge and a second signal having a falling edge before outputting the address signal to set the flags 222 and 223 in all the slave stations 200-1 to 200-N.

The serial clock control circuit 203 in the master station 200 is thereafter activated to output a clock signal on the clock wire 300. Since the charging and discharging of the wire 300 are carried out by the transistors 211 and 212, respectively, the clock signal has sharp leading and falling edges. The control circuit 203 further supplies a shift clock to the shift register 220 which thus outputs each bit of the address data in response to change from the high level to the low level of the shift clock. Thus, the master station 200 outputs the clock signal on the clock wire 300 and transmits each bit of the address signal on the data wire 400 in synchronism with the falling edge of the associated clock pulse of the clock signal, as shown in FIG. 5. The clock signal and the address signal are supplied in common to all the slave stations 200-1 to 200-N. Each slave station catches each bit of the address signal in its shift register 220 in synchronism with the leading edge of the associated clock pulse of the clock signal.

When each of the slave stations 200-1 to 200-N receives the last bit of the address data in synchronism with the leading edge of the eighth clock pulse, the serial data control circuit 207 produces an interrupt-signal 228 to the CPU 224. As a result, the CPU 224 reads out the contents of the flags 222 and 223 and the data in the shift register 220. Since both of the flags 222 and 223 are "1", the CPU 224 judges that the data in the shift register 220 is address data, and thus compares it with the inherent address data allotted in each slave station. Assuming that the master station 200 has transmitted the address data for selecting the slave station 200, only the CPU 224 in the slave station 200 obtains an address coincide result and thus stores the data "1" in the acknowledge-signal output circuit 204. Thus, the slave station 200-1 is selected. In the remaining slave stations, the circuit 204 continues to the data "0". The flags 222 and 223 are reset simultaneously with the data control of the acknowledge-signal output circuit 204, as shown in FIG. 5.

The serial clock control circuit 203 in each slave station detects the falling edge of the ninth clock pulse on the clock wire 300 and supplies an enabling-signal to the acknowledge-signal output circuit 204. As a result, the transistor 229 in the selected slave station 200-1 is turned ON to produce the low level on the data wire 400. That is, the selected slave station 200-1 outputs an acknowledge-signal on the data wire 400 in synchronism with the falling edge of the ninth clock pulse. In the master station 200, the serial clock control circuit 203 catches the output level of the input buffer 208 in synchronism with the leading edge of the ninth clock to detect the acknowledge-signal from the slave station 200-1. The acknowledge-signal output circuit 204 in the selected slave station 200-1 is brought into the inactivated state by the succeeding falling edge on the clock wire 300, so that the data wire 400 is changed to the high level by the resistor 450. The serial clock output circuit 203 in the master station 200 thereafter stops the output of the clock signal, as shown in FIG. 5.

If the selected slave station 200-1 is such a station, a semiconductor memory or an input/output interface device, for example, that requires a command, the master station 200 should output a command data signal which contains address selection information of a memory or port select information of an interface device and data read/write control information. For this purpose, the CPU 224 in the master station 200 stores the command data in the shift register 220 and the data "0" in the presetable latch circuit 219. The transistor 229 is thereby turned ON to produce on the data wire 400 in change from the high level to the low level while the clock wire 300 is in the high level, as shown in FIG. 5. As a result, the falling edge detector 209 in the selected slave station 200 sets its flag 222. The master station 200 thereafter activates the serial clock control circuit 203 to output the serial clock signal on the clock wire 300 and transmits the command data signal on the data wire 400, as shown in FIG. 5.

When the selected master station 200-1 receives the last bit of the command data signal, the CPU 224 is supplied with the interrupt-signal 228 and then reads out the contents of the flags 222 and 223 and the data in the shift register 220. Since only the flag 222 is "1", the CPU 224 judges that the data in the shift register 220 is command data, and then decodes it. Thus, master station 200 outputs only the second signal on the data wire 400 before transmitting the command data signal. The slave station 200-1 sends back an acknowledge-signal to the master station 200.

When the master station 200 detects the acknowledge-signal, the CPU 224 stores into the shift register 220 data to be processed by the slave station 200-1. The serial clock control circuit 203 is in this case continued to be activated, but it does not supply the shift clock to the shift register 220 until the data wire 400 is set free. When the serial clock control circuit 203 detects the free condition of the data wire 400, it supplies the shift clock to the shift register 220, so that the master station 200 transmits the data signal to the selected slave station 200-1. Thus, both of the first and second signals are not outputted on the data wire 400 in the case of transmitting the data signal. When the last bit of the data signal is transmitted, the CPU 224 in the slave station 200-1 reads out the contents of the flags 222 and 223 and the data in the shift register 220. Since both of the flags 222 and 223 are "0", the CPU 224 judges that the data read out of the shift register 220 is data to be processed. The slave station 200-1 thereafter sends back an acknowledge-signal to the master station 200.

If the command data signal contains information representing that the master station 200 wants to receive data from the slave station 200-1, the CPU 224 in the slave station 200-1 stores the required data into the shift register 220 and sets the transmitting/receiving control flag 205. Simultaneously, the acknowledge-signal output circuit 204 is stored with the data "1", and an acknowledge-signal is then sent back to the master station 200. The master station 200 detects the acknowledge-signal and resets its transmitting/receiving control flag 205. Thus, the master station 200 is changed to a receiving station and the slave station 200-1 is changed to transmitting station. The serial clock control circuit 203 in the slave station 200-1 supplies the shift clock to the shift register 220 after the data wire 400 is set free. Thus, the slave station 200-1 operates as a transmitting station and transmits each bit of the data signal on the data wire 400 in synchronism with each falling edge of the clock signal supplied from the master station 200, and the master station 200 operates as a receiving station and receives each bit of the data signal on the data wire 400 in synchronism with each leading edge of the clock signal. The master station 200 thereafter sends an acknowledge-signal back to the slave station 200-1.

Since the data transmitting and data receiving are carried out in synchronism with the sharp falling edge and sharp leading edge of the clock signal, a data communication between stations are attained at a high speed. In addition, by detecting the contents of the flags 222 and 223, the slave station can judge the kinds of the received signal surely and easily.

Moreover, the transmitting order of the command and data signals is not limited and the number of these signals is not limited, as shown in FIG. 6. More specifically, the master station 200 outputs on the data wire 400 both of the first and second signals and then transmits an address signal to select one of the slave stations 200-1 to 200-N. The master station 200 thereafter transmits first and second data signals $D_1$ and $D_2$ to the selected slave station, followed by outputting only the second signal to transmit a command signal thereto. Subsequently, the selected slave station operates as a transmitting station to transmit a third data signal $D_3$ to the master station 200. The master station 200 outputs again both of the first and second signals and then transmits another address signal to select another of the slave stations 200-1 to 200-N. The master station 200 thereafter outputs only the second signal to transmit a command signal, followed by transmitting a fourth data signal $D_4$ to a newly selected slave and receiving station.

If there is only one master station, all the slave stations do not require the mode register 202 and the serial clock output circuit 201.

The present invention is not limited to the above embodiments but can be modified and changed without departing from the scope and spirit of the invention.

What is claimed is:

1. A communication system comprising:
   a plurality of stations,
   a single clock wire interconnecting said stations, and
   a single data wire interconnecting said stations, wherein
   at least one of said stations operates as a master station, a pair of stations in said stations operate as a transmitting station and a receiving station, respectively,
   said master station including a push-pull transistor circuit for driving said single clock wire to output a clock signal on said single clock wire,
   said single data wire being coupled to wired logic means, said transmitting station including a first shift register temporarily storing data to be transmitted, means coupled to said single clock wire for supplying said clock signal to said first shift register, said first shift register shifting and outputting each bit of said data in synchronism with one of falling and leading edges of the associated clock pulse of said clock signal and means coupled between said first shift register and said single data line for transmitting each bit of said data outputted from said first shift register on said single data wire,
   said receiving station including a second shift register, means coupled to said single clock wire for supplying said clock signal on said single clock wire to said second shift register, and means coupled between said single data wire and said second shift register for supplying said second shift register with each bit of said data on said single data wire, said second shift register receiving each bit of said data supplied thereto in synchronism with the other of said falling and leading edges of the associated clock pulse of said clock signal.

2. The system as claimed in claim 1, wherein said push-pull transistor circuit has a first transistor connected between a first power terminal and said single clock wire and a second transistor connected between a second power terminal and said single clock wire, and said master station further includes means for turning ON one of said first and second transistors.

3. The system as claimed in claim 2, wherein said first transistor is of one conductivity type and said second transistor is of an opposite conductivity type.

4. The system as claimed in claim 2, wherein logic means comprises a resistor connected between said single data wire and said first power terminal and each of said stations includes a third transistor connected between said single data wire and said second power terminal.

5. A communication system comprising:
   a plurality of stations, each of said stations including first and second terminals;

a first wire interconnecting said first terminals of said stations;

a second wire interconnecting said second terminals of said stations; and an impedance element connected between said second wire and a power terminal; wherein one of said stations operates as a master station and each of the remaining stations operate as a slave station;

said master station further including a transistor push-pull circuit connected to said first terminal thereof and driving said first wire to output a clock signal on said first wire or to maintain said first wire at a first logic level, means for outputting a first signal on said second wire to change said second wire from said first logic level to a second logic level while said first wire is maintained at said first logic level, means for outputting a second signal on said second wire to change said second wire from said second logic level to said first logic level while said first wire is maintained at said first logic level, means for transmitting an address signal on said second wire in synchronism with said clock signal after both of said first and second signals are outputted on said second wire, said address signal containing first information for selecting one of said slave stations, means for transmitting a command signal on said second wire in synchronism with said clock signal after said first signal is outputted on said second wire without said second signal being outputted, said command signal containing second information for designating the slave station to be selected to a data receiving mode or a data transmitting mode, and means for transmitting a master data signal on said second wire in synchronism with said clock signal when the slave station to be selected is designated to said data receiving mode;

each of said slave stations further including means coupled to said first and second terminals thereof for detecting whether said first signal is outputted on said second wire to produce a first detection signal, means coupled to said first and second terminals thereof for detecting whether said second signal is outputted on said second wire to produce a second detection signal, and means coupled to said first and second terminals for receiving said address signal on said second wire in synchronism with said clock signal on said first wire when both of said first and second detection signals are produced, and wherein each of said slave stations means for comparing said first information contained in the received address signal with an individually allotted address information to produce a third detection signal when said first information is coincident with the individually allotted address information, means coupled to said first and second terminals thereof for receiving said command signal on said second wire in synchronism with said clock signal on said first wire when both of said first and third detection signals are produced, means for detecting which of said data receiving mode and said data transmitting mode is designated in response to said second information contained in the received command signal, means coupled to said first and second terminals thereof for receiving said master data signal on said second wire in synchronism with said clock signal on said first wire when said data receiving mode is designated, and means coupled to said first and second terminals thereof for transmitting a slave data signal on said second wire in synchronism with said clock signal on said first wire when said data transmitting mode is designated; and wherein said master station further includes means coupled to said second terminal thereof for receiving said slave data signal on said second wire in synchronism with said clock signal.

6. The system as claimed in claim 5, wherein said transistor push-pull circuit has a first transistor connected between said first terminal and said power terminal and a second transistor connected between said first terminal and a reference terminal and each of said stations further includes a third transistor connected between said second terminal and said reference terminal.

7. The system as claimed in claim 6, wherein said first transistor is of one conductivity type and said second and third transistors are of an opposite conductivity type.

8. A data processor for communicating with at least one external device through a clock wire and a data wire, said data processor comprising;

a first terminal to be connected to said external device through said clock wire, a second terminal to be connected to said external device through said data wire, a third terminal applied with a power voltage, a fourth terminal applied with a reference voltage, a first transistor connected between said first and third terminals, a second transistor connected between said first and fourth terminals, a third transistor connected between said second and fourth terminals, a mode register, means for setting said mode register in a master operation mode and for resetting said mode register in a slave operation mode, a flag register, means for setting said flag register in a data transmitting operation mode and for resetting said flag register in a data receiving operation mode, a shift register having a shift clock mode supplied with a shift clock signal, a data input node, a data output node, and a set of data input/output nodes, said shift register outputting, in said data transmitting operation mode, data stored therein to said data output mode one bit at a time in synchronism with said shift clock signal and introducing, in said data receiving operation mode, data supplied to said data input node one bit at a time in synchronism with said shift clock signal, said processor further comprising:

means coupled to said data output node of said shift register for turning said third transistor ON or OFF in response to data outputted from said shift register when said flag register is set to thereby transmit data outputted from said shift register on said data wire via said second terminal and for turning said third transistor OFF when said flag register is reset, means coupled between said second terminal and said data input mode of said shift register for supplying in said data receiving operation mode, said data input mode with data transferred to said second terminal from said external device via said data wire, means for writing data to be transmitted into said shift register via said set of data input/output modes in said data transmitting operation mode, means for reading data out of said shift register via said set of data input/output modes in said data transmitting operation mode, means for producing a serial clock signal, means for alternately turning said first and second transistors ON in response to said serial clock signal when said mode register is set to thereby output said serial clock signal on said clock wire via said first terminal and for turning both of said first and second transistors OFF when said mode register is reset, means for supplying, in said master operation mode, said serial clock signal to said shift clock mode of said shift register as said shift clock signal, and means coupled to said first terminal for supplying, in said slave operation mode, said shift clock mode of said shift register with a clock signal transferred to said first terminal front said external device via said clock wire.

9. A communication system comprising a master station including:

first and second terminals;

a plurality of slave stations, each of which includes third and fourth terminals;

a clock wire interconnecting said first terminal of said master station and said third terminals of said slave stations;

a data wire interconnecting said second terminal of said master station and said fourth terminals of said slave stations; and a resistor connecting said data wire to a power terminal;

said master station further including:

a transistor push-pull circuit connected to said first terminal and driving said clock wire to output a serial clock signal on said clock wire or to maintain said clock wire at one of a plurality of binary logic levels, means coupled to said second terminal for outputting a first signal to change said data wire from said one logic level to the other logic level while said clock wire is maintained at said one logic level, means for outputting a second signal to change said data wire from said other logic level to said one logic level while said clock wire is maintained at said one logic level, means coupled to said second terminal for transmitting an address signal on said data wire in synchronism with said serial clock signal after both of said first and second signals are outputted, said address signal contained information for selecting one of said slave stations, means coupled to said second terminal for transmitting a command signal on said data wire in synchronism with said serial clock signal after only one of said first and second signals are outputted, said command signal containing information for designating the slave station to b selected to a data receiving mode or a data transmitting mode, and means coupled to said second terminal for transmitting a data signal on said data wire in synchronism with said serial clock signal without both of said first and second signals being outputted, said data signal containing information to be processed by the slave station to be selected; and wherein each of said slave stations further includes first and second flags, means coupled to said third and fourth terminals for detecting that said first signal is outputted and for setting said first flag when said first signal is detected to be outputted, means coupled to said third and fourth terminals for detecting that said second signal is outputted and for setting said second flag when said second signal is detected to be outputted, means coupled to said third and fourth terminals for receiving the signal on said data wire in synchronism with said serial clock signal on said clock wire, and means coupled to said first and second flags and to said receiving means for detecting that said receiving means has received which of said address, command and data signals in response to contents of said first and second flags.

10. The system as claimed in claim 9, wherein each of said slave stations further includes means for transmitting an acknowledgement signal on said data wire in synchronism with said serial clock signal on said clock wire after any one of said address, command and data signal being received in said receiving means and means for resetting both or one of said fist and second flags after said address or command signal is received in said receiving means.

* * * * *